United States Patent [19]
Gratowski et al.

[11] Patent Number: 6,131,241
[45] Date of Patent: Oct. 17, 2000

[54] CARPET LOCATOR AND RETAINING SYSTEM

[75] Inventors: Mark E. Gratowski, Shelby Township; Dan Ludwig, Rochester Hills; Geoff Davies, Royal Oak; Joe Dansbury, Grosse Pointe Woods, all of Mich.

[73] Assignee: DaimlerChrysler Corporation, Auburn Hills, Mich.

[21] Appl. No.: 09/213,765

[22] Filed: Dec. 17, 1998

[51] Int. Cl.[7] .................................................. A47G 27/04
[52] U.S. Cl. ........................................................ 16/4; 16/8
[58] Field of Search ............................ 16/4–10; 411/508, 411/913; 296/97.23

[56] References Cited

U.S. PATENT DOCUMENTS

| | | | |
|---|---|---|---|
| 1,826,988 | 10/1931 | Campbell, Jr. ................................ | 16/4 |
| 2,657,948 | 11/1953 | Sturtevant ..................................... | 16/4 |
| 4,406,033 | 9/1983 | Chisholm et al. ............................ | 16/4 |
| 4,829,627 | 5/1989 | Altus et al. ................................... | 16/4 |
| 4,998,319 | 3/1991 | Ford ............................................. | 16/4 |
| 5,014,390 | 5/1991 | De Gastines ................................. | 16/4 |
| 5,192,599 | 3/1993 | Sakamoto ..................................... | 16/4 |
| 5,666,691 | 9/1997 | Bealing et al. ............................... | 16/4 |
| 5,775,860 | 7/1998 | Meyer ...................................... | 411/508 |
| 5,813,810 | 9/1998 | Izume ...................................... | 411/913 |
| 5,851,097 | 12/1998 | Shereyk et al. .......................... | 411/508 |

Primary Examiner—Chuck Y. Mah

[57] ABSTRACT

A carpet locating and retaining system for a vehicle and a method of using the same having a head portion and a body portion. The device further includes retaining means for retaining the device within an aperture formed in the vehicle and fastener receiving means for receiving a fastener therein. The device eliminates the need for a separate locator for the carpet and a retaining system for a cover plate.

8 Claims, 2 Drawing Sheets

6,131,241

CARPET LOCATOR AND RETAINING SYSTEM

FIELD OF THE INVENTION

The present invention relates to a method and apparatus for installing carpet in a vehicle and, more particularly, to an installation method and apparatus capable of locating and retaining carpet in the vehicle and retaining a cover plate thereon.

BACKGROUND OF THE INVENTION

As is well known, most vehicles are appointed with carpet about the passenger and trunk compartments. This carpet is typically precut to a desired shape, which corresponds to a desired coverage area in the vehicle. The carpet typically includes a plurality of locating holes to enable the carpet to be quickly positioned within the vehicles. These locating holes formed in the carpet correspond to a plurality of holes formed in the floorboard of the vehicle, which together define an aligned hole for receiving a carpet-fastening device.

In many current vehicle designs, such as minivans, rear seating in the vehicle is adapted to be removably secured to a support structure, or dogbone, formed in the floorboard of the vehicle. Consequently, the carpet is cut to enable the support structure to protrude therethrough and a cover plate, or escutcheon, is fastened over the support structure to provide an aesthetic finish.

In known designs, the carpet is first attached to the floorboard of the vehicle by inserting the carpet-fastening device through the previously aligned holes formed in the carpet and the floorboard. Preferably, these holes are located adjacent to the support structure to enable the holes and fastening device to be concealed under the cover plate for an improved aesthetic quality. Thus, the cover plate is positioned over the support structure and is extended a length over the carpet-fastening device. The cover plate currently must extend an additional length past the carpet-fastening device in order to provide a location in which a cover plate fastener may attach the cover plate to the floorboard of the vehicle.

However, it should be appreciated to one skilled in the art that this additional length of the cover plate is disadvantageous for various reasons. For example, the additional length of the cover plate requires additional material to form the cover plate; thus, the cost of manufacturing the cover plate is increased. Additionally, the use of two fastening devices (i.e. carpet fastening device and cover plate fastener) increases the assembly time and further increases the manufacturing cost of the assembly. Still further, the additional length of the cover plate may detract from the aesthetic quality of the vehicle.

Accordingly, there exists a need in the relevant art to provide a method and apparatus for installing carpet in a vehicle capable of locating and retaining the carpet and cover plate using a single device, which reduces the manufacturing cost and assembly time of the carpet installation.

SUMMARY OF THE INVENTION

In accordance with the broad teachings of this invention, a carpet locator and retaining system having an advantageous construction and method of installation is provided.

According to the teachings of the present invention, a carpet locating and retaining assembly for a vehicle is provided. The assembly comprises a carpet having an aperture and a locating and retaining device extending therethrough. The locating and retaining device includes a head portion and a body portion. The device further includes retaining means for retaining the device within an aperture formed in the vehicle and fastener receiving means for receiving a fastener therein. Lastly, the assembly includes a cover plate having an aperture and a fastener for extending through the aperture formed in the cover plate. The fastener is received within the fastener receiving means of the locating and retaining device. The assembly, thus, positively locates and secures the carpet in the vehicle and provides means for fastening the cover plate thereto.

Furthermore, a method for locating and retaining carpet in a vehicle is also provided. The method comprising the steps of: (1) providing an aperture formed in the vehicle; (2) providing carpet having an aperture corresponding to the aperture formed in the vehicle; (3) positioning the aperture of the carpet adjacent the aperture formed in the vehicle; (4) providing a retaining device having a head portion, a body portion, wherein the body portion is formed integrally with the head portion, retaining means for retaining the device within the aperture formed in the vehicle, and fastener receiving means for receiving a fastener therein; (5) inserting the body portion of the retaining device through the apertures until the retaining means engages the aperture formed in the vehicle; (6) providing a fastener; (7) providing a cover plate having an aperture and positioning the aperture of the cover plate adjacent the fastener receiving means; and (8) inserting the fastener through the aperture in the cover plate and engaging the fastener within the fastener receiving means, thereby locating and retaining the carpet and cover plate in a desired location.

Further areas of applicability of the present invention will become apparent from the detailed description provided hereinafter. It should be understood that the detailed description and specific examples, while indicating a preferred embodiment of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses. For example, the carpet locator and retainer device of the present invention may have utility in locating and retaining various materials, such as, but not limited to, hard flooring and, in various applications, such as, but not limited to, recreational vehicles and boats.

Figure 2:
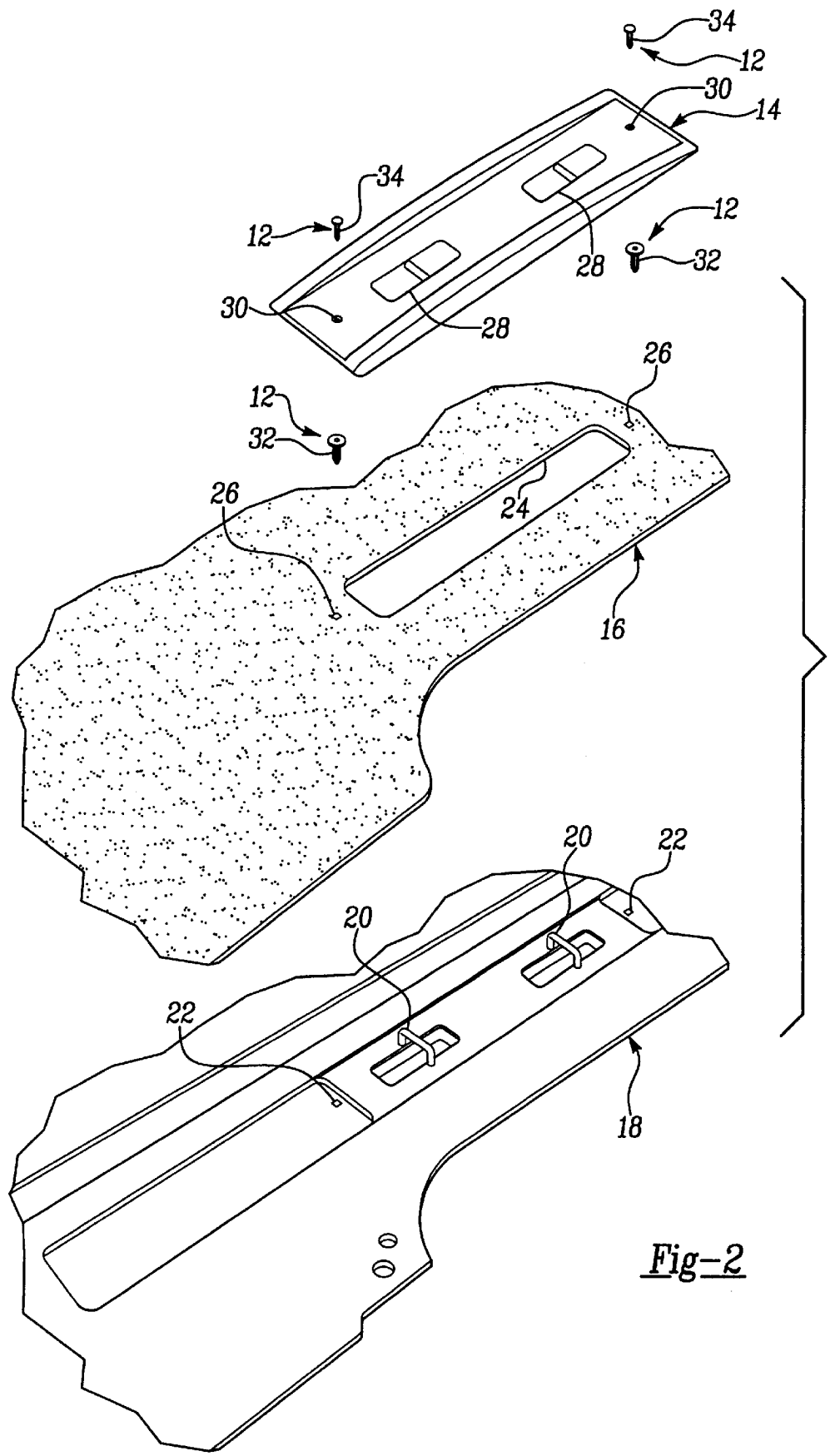
FIG. 2 is an exploded perspective view, similar to FIG. 1.

Referring to the drawings, a carpet locator and retaining system 10 is shown having a fastening assembly 12 for locating and retaining a cover plate or escutcheon 14 and carpet 16 to a floorboard 18 of a vehicle (not shown). As best seen in FIG. 2, floorboard 18 includes a plurality of support structures or dogbones 20 adapted to receive and support a seat (not shown) thereon. Floorboard 18 further includes a plurality of apertures 22 positioned adjacent the plurality of support structures 20. The plurality of apertures 22 formed in floorboard 18 is preferably square-shaped to mate with fastening assembly 12. However, it is anticipated that the plurality of apertures 22 may be of any shape conducive to receiving a fastening device therein. Floorboard 18 is typically made of sheet metal.

Carpet 16 is shown having a predetermined shape corresponding to floorboard 18 and is made of a material known in the art. Carpet 16 includes a cutout 24 and a plurality of apertures 26. Cutout 24 is adapted to enable a pair of support structures 20 to extend therethrough. Each of the plurality of apertures 26 formed in carpet 16 is adapted to align with a corresponding one of the plurality of apertures 22 formed in floorboard 18 and enable fastening assembly 12 to pass therethrough.

Similarly, cover plate 14 includes a pair of openings 28 and a plurality of apertures 30. The pair of openings 28 is adapted to enable the pair of support structures 20 to extend therethrough so as to receive a seat removably mounted thereon. Each of the plurality of apertures 30 formed in cover plate 14 is adapted to align with a corresponding one of both the plurality of apertures 26 and the plurality of apertures 22, and enable fastening assembly 12 to pass therethrough. Cover plate 14 provides an aesthetic finish to conceal the edge of carpet 16 and support structures 20, and may have any shape conducive to providing an improved aesthetic quality.

Figure 1:
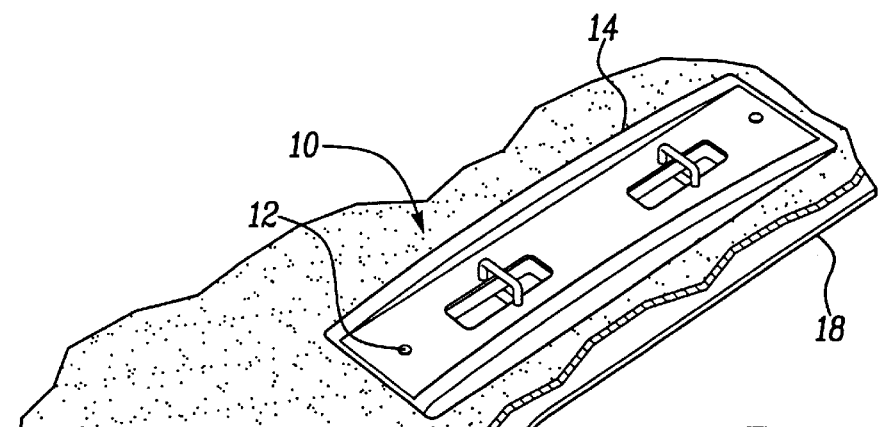
FIG. 1 is a perspective view of an interior of a vehicle illustrating a floorboard, carpet, a cover plate, and a carpet locator and retaining device according to the teachings of the present invention.
Figure 3:
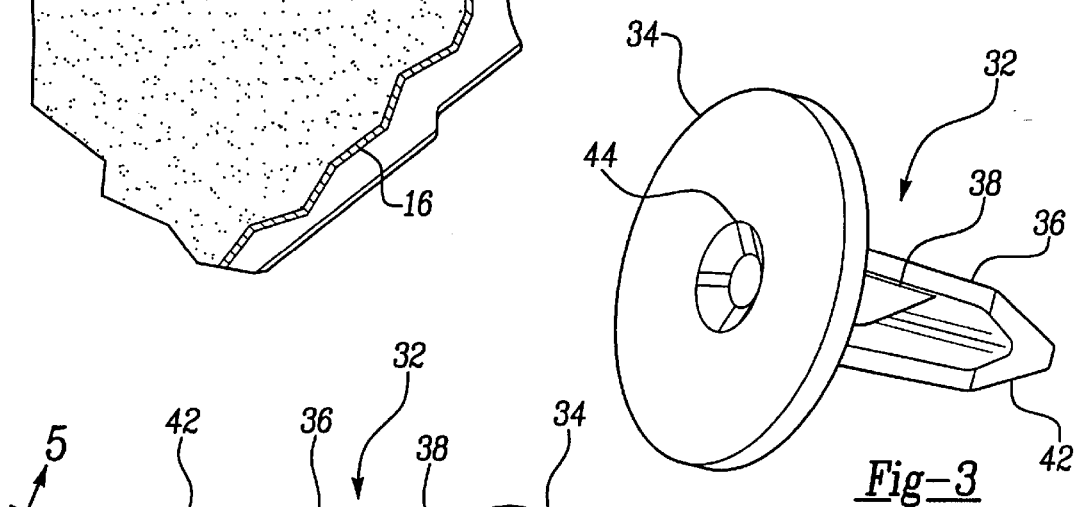
FIG. 3 is a top perspective view of the grommet of the present invention illustrating the fastener-receiving aperture.
Figure 4:
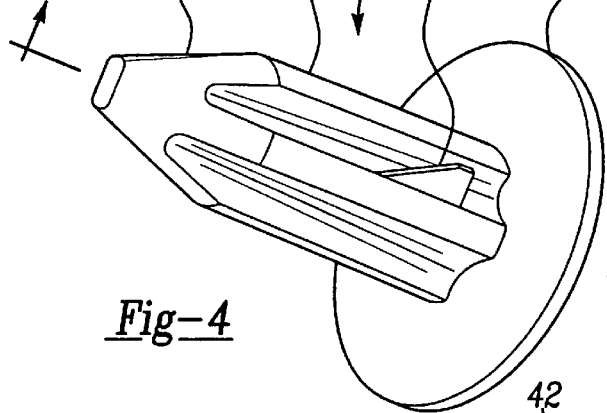
FIG. 4 is a bottom perspective view of the grommet illustrating the retaining tabs.
Figure 5:
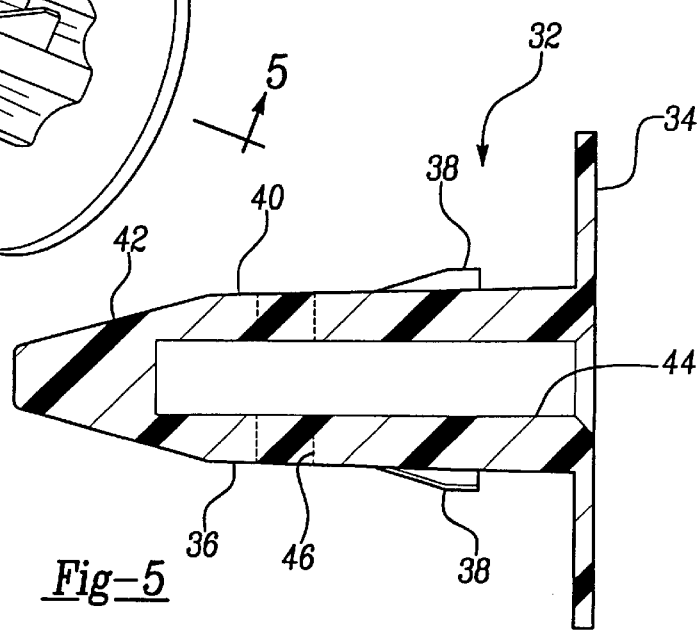
FIG. 5 a cross-section view of FIG. 4, taken along line 5—5.

Fastening assembly 12 is provided for locating carpet 16 and cover plate 14 relative to the plurality of apertures 22 of floorboard 18. Fastening assembly 12 includes a grommet 32 and a fastener 34, such as a screw or the like. As best seen in FIGS. 3–5, grommet 32 includes a head portion 34 and an elongated body portion 36. Preferably, head portion 34 and body portion 36 are integrally formed and are made of plastic. Grommet 32 is positioned between cover plate 14 and carpet 16 to locate and secure carpet 16 to floorboard 18. To this end, grommet 32 further includes a pair of retaining tabs 38 formed integrally with a sidewall portion 40 of body portion 36. The pair of retaining tabs 38 is outwardly biased to engage an undersurface of floorboard 18. Such engagement will be described in detail below. Body portion 36 of grommet 32 includes a tapered end portion 42 to aid in the insertion of grommet 32 into the plurality of apertures 22, 26 and is square-shaped. The square shaped enables body portion 36 of grommet 32 to engage the square shape of the plurality of apertures 22 formed in floorboard 18 to minimize torsional movement of grommet 32 relative to floorboard 18. Head portion 34 is enlarged to cover a larger area of carpet 16 to insure adequate retention capability. Grommet 32 still further includes a centrally positioned bore 44 adapted to receive fastener 34 therein.

It is anticipated that grommet 32 may further include a plurality of bores 46 (shown in phantom in FIG. 5) extending transversely through body portion 36. The plurality of bores 46 enable body portion 36 to expand when fastener 34 is disposed in bore 44, thereby providing additional retention capability.

During installation, carpet 16 is first positioned on floorboard 18 such that one of the plurality of apertures 26 formed in carpet 16 is aligned with one of the plurality of apertures 22 formed in floorboard 18 and support structure 20 extends therethrough. Grommet 32 is then inserted into the aligned apertures 22, 26. During insertion of grommet 32, the pair of retaining tabs 38 is forced inwardly by the force of insertion. The pair of retaining tabs 38 remains inwardly folded until grommet 32 is fully inserted into floorboard 18. The pair of retaining tabs 38 then bias outwardly to engage an under side of floorboard 18, thereby locating and retaining carpet 16 with floorboard 18. Cover plate 14 is then positioned on carpet 16 to provide improved aesthetic quality. Each of the plurality of apertures 30 formed in cover plate 14 is aligned with bore 44 of the corresponding grommet 32. Fastener 34 is then inserted into each of the plurality of apertures 30 formed in cover plate 14 and engaged with bore 44 of the grommet 32 to secure cover plate 14 in a desired location. The square shape of body portion 36 and aperture 22 minimizes torsional movement of grommet 32 when fastener 34 is engaged in bore 44.

It should be appreciated from the foregoing that the carpet locator and retention device of the present invention is capable of positively locating and retaining the carpet in a vehicle. It should further be appreciated that the carpet locator and retention device of the present invention is capable of retaining the carpet and cover plate using a single device, rather than the multiple fasteners of the prior art. Consequently, reduced manufacturing costs and assembly times associated with installing carpet in a vehicle may be reduced. Additionally, reduced manufacturing costs may be realized as a result of reducing the amount of material used in fabricating the cover plate.

The invention being thus described, it will be obvious that the same may be varied in many ways. Such variations are not to be regarded as a departure from the spirit and scope of the invention. Such variations or modifications, as would be obvious to one skilled in the art, are intended to be included within the scope of the following claims.

What is claimed is:

1. A carpet locating and retaining assembly for a vehicle, said assembly comprising:

a carpet having an aperture formed therethrough;

a locating and retaining device extending through said aperture formed in said carpet, said locating and retaining device comprising:
  a head portion,
  a body portion,
  retaining means for retaining said locating and retaining device within an aperture formed in the vehicle, and
  fastener receiving means for receiving a fastener therein;

a cover plate having an aperture formed therethrough, said cover plate being positioned upon said carpet; and a fastener extending through said aperture formed in said cover plate, said fastener being received within said fastener receiving means of said locating and retaining device.

2. The assembly according to claim 1 wherein said retaining means of said locating and retaining device comprises an outwardly-biased retaining tab integrally formed in said body portion, said retaining tab being adapted to engage said aperture formed in the vehicle.

3. The assembly according to claim 1 wherein said fastener receiving means of said locating and retaining device comprises a bore extending through said head portion and into said body portion, said bore adapted to receive said fastener therein.

4. The assembly according to claim 1, further comprising:

an expansion aperture formed in a sidewall of said body portion for enabling said body portion to expand during insertion of said fastener.

5. The assembly according to claim 1 wherein said body portion is generally square-shaped to resist torsional translation.

6. A carpet locator and retaining system for a vehicle, said system comprising:

a carpet having an aperture formed therethrough;

a retaining and locating device extending through said aperture formed in said carpet, said device comprising:
an elongated body portion having a head portion and a tapered end portion,
a retaining tab being integrally formed with said elongated body portion, said retaining tab being outwardly-biased to engage within an aperture formed in the vehicle, and
a bore centrally disposed in said elongated body;

a cover plate having an aperture formed therethrough, said cover plate being positioned upon said carpet; and a fastener extending through said aperture formed in said cover plate, said fastener being received within said bore formed in said retaining and locating device.

7. The carpet locator and retaining system according to claim 6, further comprising:

an expansion aperture formed in said elongated body portion for enabling said elongated body portion to expand during insertion of said fastener, said expansion aperture being disposed transverse to a longitudinal axis of said elongated body portion.

8. The carpet locator and retaining system according to claim 6 wherein said elongated body portion is generally square-shaped to resist torsional translation.

* * * * *